JOHN MARQUIS.
Stench-Trap.

No. 127,496.  Patented June 4, 1872.

Witnesses:
Geo. N. Strong
John L. Smith

Inventor:
John Marquis.

127,496

UNITED STATES PATENT OFFICE.

JOHN MARQUIS, OF SAN FRANCISCO, CALIFORNIA.

IMPROVEMENT IN STENCH-TRAPS.

Specification forming part of Letters Patent No. 127,496, dated June 4, 1872.

SPECIFICATION.

*To all whom it may concern:*

Be it known that I, JOHN MARQUIS, of San Francisco, in the county of San Francisco and State of California, have invented a new and useful Improvement in Stench-Traps; and I do hereby declare that the following is a full and exact description of the same, reference being had to the accompanying drawing and to the letters of reference marked thereon.

The object of my invention is to provide a stench-trap for wash-basins that can be conveniently attached to the plug or strainer by means of the screws or couplings, and also to the overflow-pipe.

To accomplish this I employ that form of trap commonly known as the "bell-trap," and cover the same with a spherical cap or covering, in which are the places of connection for the strainer, and also for the overflow-pipe.

Figure 1:
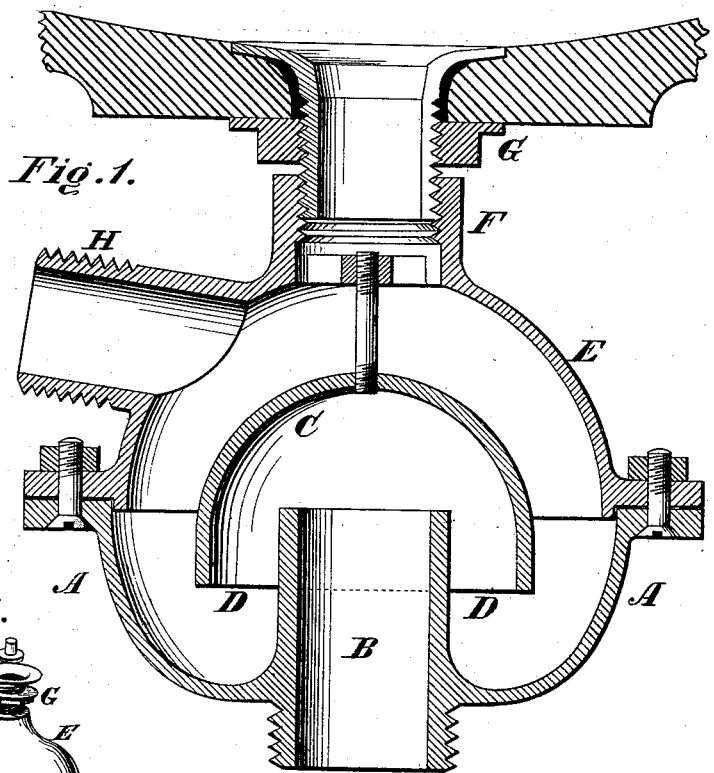
Figure 3:
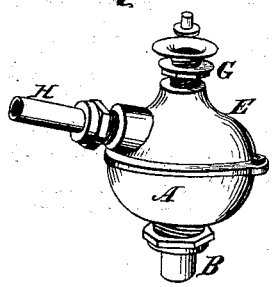
Figure 2:
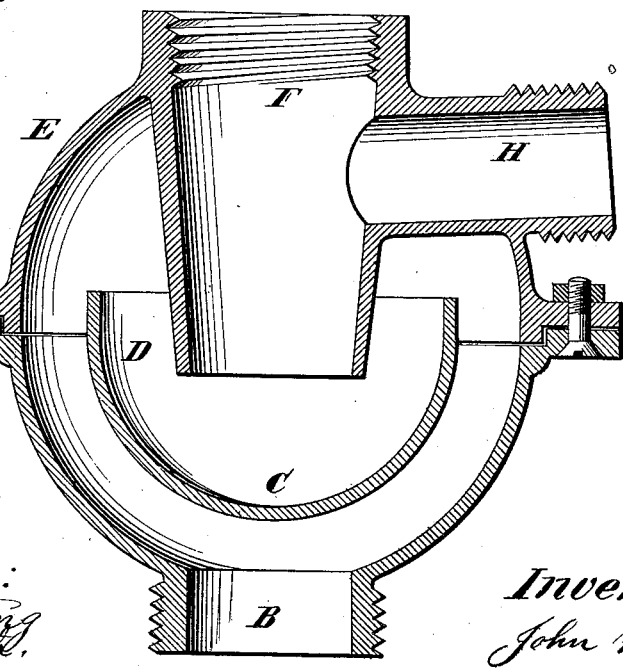

Referring to the accompanying drawing, Figure 1 is a vertical section of my trap as employed for wash-basins. Fig. 2 is another form of trap on which my spherical cap or covering can be used.

A is a vessel or bowl, made preferably semi-globular. This bowl is provided with a pipe, B, which projects up through the bottom, and the inverted cap or bell C stands over it so as to form the trap D. This form of trap is known as the bell-trap. The whole of this lower part is covered by the hemisphere E, which is bolted to it, as shown, and is provided with the upward-projecting pipe F, to which the strainer G may be attached. H is a pipe made upon the side to which the overflow-pipe may be attached.

By this construction I am enabled to provide a simple and efficient way of connecting this form of trap to either wash-basin or sink by means of screws and coupling.

I do not claim this form of trap or the manner in which the stench is prevented from returning; but What I do claim, and desire to secure by Letters Patent, is—

The cap or covering E, when used in combination with the form of trap specified, said cap having a place of connection for the strainer and overflow-pipe, as described.

In witness whereof I have hereunto set my hand.

JOHN MARQUIS.

Witnesses:
   GEO. H. STRONG,
   JOHN L. SMITH.